United States Patent
Deng et al.

(10) Patent No.: US 8,972,253 B2
(45) Date of Patent: Mar. 3, 2015

(54) DEEP BELIEF NETWORK FOR LARGE VOCABULARY CONTINUOUS SPEECH RECOGNITION

(75) Inventors: Li Deng, Redmond, WA (US); Dong Yu, Kirkland, WA (US); George Edward Dahl, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 12/882,233

(22) Filed: Sep. 15, 2010

(65) Prior Publication Data

US 2012/0065976 A1   Mar. 15, 2012

(51) Int. Cl.
*G10L 15/00* (2013.01)
*G10L 15/16* (2006.01)
*G10L 15/14* (2006.01)

(52) U.S. Cl.
CPC ...................................... *G10L 15/14* (2013.01)
USPC .......................................... 704/231; 704/232

(58) Field of Classification Search
CPC ..... G10L 15/142; G10L 15/144; G10L 15/16; G10L 15/14; G10L 25/30; G10L 17/16
USPC .................................................. 704/231–257
See application file for complete search history.

(56) References Cited

U.S. PATENT DOCUMENTS

| 5,317,673 | A * | 5/1994 | Cohen et al. | 704/232 |
| 6,574,597 | B1 | 6/2003 | Mohri et al. | |
| 6,999,931 | B2 | 2/2006 | Zhou | |
| 7,254,538 | B1 * | 8/2007 | Hermansky et al. | 704/256.1 |
| 7,392,185 | B2 | 6/2008 | Bennett | |
| 2010/0049503 | A1 | 2/2010 | Kempe et al. | |
| 2010/0057435 | A1 | 3/2010 | Kent et al. | |
| 2010/0228694 | A1 * | 9/2010 | Le Roux et al. | 706/25 |
| 2010/0299303 | A1 * | 11/2010 | Horster et al. | 706/52 |
| 2012/0072215 | A1 | 3/2012 | Yu et al. | |
| 2013/0212052 | A1 | 8/2013 | Yu et al. | |

FOREIGN PATENT DOCUMENTS

| CN | 1773606 A | 5/2006 |
| WO | 93/00655 A1 | 1/1993 |

OTHER PUBLICATIONS

Renals et al., "Connectionist probability estimators in HMM speech recognition," Speech and Audio Processing, IEEE Transactions on, vol. 2, No. 1, pp. 161,174, Jan. 1994.*

(Continued)

*Primary Examiner* — Samuel G Neway
(74) *Attorney, Agent, or Firm* — Sandy Swain; Judy Yee; Micky Minhas

(57) ABSTRACT

A method is disclosed herein that includes an act of causing a processor to receive a sample, wherein the sample is one of spoken utterance, an online handwriting sample, or a moving image sample. The method also comprises the act of causing the processor to decode the sample based at least in part upon an output of a combination of a deep structure and a context-dependent Hidden Markov Model (HMM), wherein the deep structure is configured to output a posterior probability of a context-dependent unit. The deep structure is a Deep Belief Network consisting of many layers of nonlinear units with connecting weights between layers trained by a pretraining step followed by a fine-tuning step.

20 Claims, 8 Drawing Sheets

(56) References Cited

OTHER PUBLICATIONS

Hwang et al., "Shared-distribution hidden Markov models for speech recognition," Speech and Audio Processing, IEEE Transactions on, vol. 1, No. 4, pp. 414,420, Oct. 1993.*

Mohamed, et al., "Deep Belief Networks for Phone Recognition", Retrieved at << www.cs.toronto.edu/~gdahl/papers/dbnPhoneRec.pdf >>, May 31, 2009, pp. 1-9.

Hamel, et al., "Automatic Identification of Instrument Classes in Polyphonic and Poly-Instrument Audio", Retrieved at << http://ismir2009.ismir.net/proceedings/PS3-2.pdf >>, 2009, pp. 1-6.

Deselaers, et al., "A Deep Learning Approach to Machine Transliteration", Retrieved at << http://thomas.deselaers.de/publications/papers/deselaers_wmt09.pdf >>, Proceedings of the Fourth Workshop on Statistical Machine Translation, Mar. 30-31, 2009, pp. 233-241.

Chen, et al., "Using Deep Belief Nets for Chinese Named Entity Categorization", Retrieved at << http://www.aclweb.org/anthology/W/W10/W10-2416.pdf >>, Proceedings of the 2010 Named Entities Workshop, Jul. 16, 2010, pp. 102-109.

Bergen, et al., "A Senone Based Confidence Measure for Speech Recognition", Retrieved at << http://citeseerx.ist.psu.edu/viewdoc/download?doi=10.1.1.57.915&rep=rep1&type=pdf >>, Sep. 1997, pp. 1-4.

International search report, Mailed Date: Jan. 4, 2012, Application No. PCT/US2011/050472, Filed Date: Sep. 6, 2011, pp. 1-9.

Kershaw, Daniel Jeremy, "Phonetic Context-Dependency in a Hybrid ANN/HMM Speech Recognition System", Jan. 28, 1997, pp. 1-127.

Yu, et al., "Language Recognition Using Deep-Structured Conditional Random Fields", ICASSP 2010, Mar. 2010, pp. 5030-5033.

Notice on the First Office Action, The State Intellectual Property Office of the People's Republic of China, Application No. 201110289015.0, Jul. 12, 2012, pp. 1-10.

Kershaw, "Phonetic Context-Dependency in a Hybrid ANN/HMM Speech Recognition System", Jan. 28, 1997, pp. 1-127.

Notice on the Second Office Action, The State Intellectual Property Office of the People's Republic of China, Application No. 201110289015.0, Mar. 28, 2013, pp. 1-6.

International Search Report & Written Opinion for PCT Patent Application No. PCT/US2013/055898, Mailed Date: Feb. 10, 2014, Filed Date: Aug. 21, 2013, 11 Pages.

Kolda, et al., "Tensor Decompositions and Applications", In Sandia Report, Nov. 2007, pp. 1-71.

Hutchinson, et al., "A Deep Architecture with Bilinear Modeling of Hidden Representations: Applications to Phonetic Recognition", In IEEE International Conference on Acoustics, Speech and Signal Processing, Mar. 25, 2012, pp. 4805-4808.

Dahl, et al., "Context-Dependent Pre-Trained Deep Neutral Networks for Large-Vocabulary Speech Recognition", In IEEE Transactions on Audio, Speech, and Language Processing, vol. 20, Issue 1, Jan. 2012, pp. 30-42.

Notice of Allowance Received in China Patent Application No. 201110289015.0, Mailed Date: Oct. 9, 2013, Filed Date: Sep. 14, 2011, 6 Pages.

Supplementary Search Report Issued in European Patent Application No. 11825687.4, Mailed Date: Aug. 5, 2014, 3 Pages.

Office Action Issued in European Patent Application No. 11825687.4, Mailed Date: Aug. 27, 2014, 8 Pages.

Bengio, et al., "Global Optimization of a Neural Network-Hidden Markov Model Hybrid", In IEEE Transactions on Neural Networks, vol. 3, Issue 2, Mar. 1, 1992, pp. 252-259.

Trentin, et al., "A Survey of Hybrid ANN/HMM Models for Automatic Speech Recognition", In Neurocomputing, vol. 37, Issue 1, Apr. 1, 2001, pp. 91-126.

Do, et al., "Neural Conditional Random Fields", In 13th International Conference on Artificial Intelligence and Statistics, vol. 9, May 1, 2010, pp. 177-184.

Schenk, et al., "Novel Hybrid NN/HMM Modelling Techniques for On-Line Handwriting Recognition", In Proceedings of the Tenth International Workshop on Frontiers in Handwriting Recognition, Jan. 1, 2006, 6 Pages.

Wang, et al., "A Novel Method to Recognize Complex Dynamic Gesture by Combining HMM and FNN Models", In IEEE Symposium on Computational Intelligence in Image and Signal Processing, Apr. 1, 2007, pp. 13-18.

* cited by examiner

DEEP BELIEF NETWORK FOR LARGE VOCABULARY CONTINUOUS SPEECH RECOGNITION

BACKGROUND

Speech recognition has been the subject of a significant amount of research and commercial development. For example, speech recognition systems have been incorporated into mobile telephones, desktop computers, automobiles, and the like in order to provide a particular response to speech input provided by a user. For instance, in a mobile telephone equipped with speech recognition technology, a user can speak a name of a contact listed in the mobile telephone and the mobile telephone can initiate a call to the contact. Furthermore, many companies are currently using speech recognition technology to aid customers in connection with identifying employees of a company, identifying problems with a product or service, etc.

Even after decades of research, however, the performance of automatic speech recognition (ASR) systems in real-world usage scenarios remains far from satisfactory. Conventionally, Hidden Markov Models (HMMs) have been the dominant technique for large vocabulary continuous speech recognition (LVCSR). An HMM is a generative model in which the observable acoustic features are assumed to be generated from a hidden Markov process that transitions between states $S=\{s_1, \ldots, S_K\}$. The key parameters in the HMM are the initial state probability distribution $\pi=\{q_t=s_j|q_{t-1}=s_i\}$, where $q_t$ is the state at time t, the transition probabilities $a_{ij}=p(q_t=s_j|q_{t-1}=s_i)$, and a model to estimate the observation probabilities $p(x_t|s_i)$.

In conventional HMMs used for ASR, the observation probabilities are modeled using Gaussian Mixture Models (GMMs). These GMM-HMMs are typically trained to maximize the likelihood of generating the observed features. Recently, various discriminate strategies and large margin techniques have been explored. The potential of such techniques, however, is restricted by limitations of the GMM emission distribution model.

Attempts have been made to extend the conventional GMM-HMM architecture so that discriminative training becomes an inherent part of the model. For example, the use of artificial neural networks (ANNs) has been proposed to estimate observations probabilities. Such models have been referred to as ANN-HMM hybrid models and were, in the recent past, viewed as a promising technique for LVCSR. Such hybrids, however, have been associated with various limitations. For instance, using only backpropagation to train a feed-forward ANN does not exploit more than two hidden layers well. Accordingly, given the deficiencies in conventional ASR systems, improved ASR systems are desirable.

SUMMARY

The following is a brief summary of subject matter that is described in greater detail herein. This summary is not intended to be limiting as to the scope of the claims.

Described herein are various technologies pertaining to automatic speech recognition (ASR). More particularly, described herein are various technologies pertaining to a context-dependent Deep Believe Network (DBN)-Hidden Markov Model (HMM) for employment in ASR. The DBN can be configured to output a distribution over senones, and the HMM can be configured to output transition probabilities between senones. Senones are basic subphonetic units that can be represented by states in the HMM. Alternatively, if the number of states in the HMM is prohibitively large, senones can be represented as clustered state-dependent output distributions. These two outputs can be utilized by a decoder to decode a sample, wherein the sample is a spoken word, portion of a word, or phrase.

In addition, training a DBN-HMM for utilization in ASR is described herein. Pursuant to an example, the DBN-HMM can be trained using an embedded Viterbi algorithm. To support training and utilization of the DBN-HMM, a series of tools can be developed. Some of such tools include a tool to convert a Gaussian Mixture Model (GMM)—HMM to a DBN-HMM, a tool to align frames in training data to train the DBN-HMM, and a DBN-HMM decoder.

While context-dependent DBN-HMMs herein have referred to training and utilization of a DBN-HMM in connection with ASR, it is to be understood that context-dependent DBN-HMMs can be employed in other contexts. For example, context-dependent DBN-HMMs can be utilized in connection with online handwriting recognition and automatic human activity recognition/detection. Furthermore, other deep structures can be employed rather than DBNs to perform ASR and other sequential pattern recognition tasks.

Other aspects will be appreciated upon reading and understanding the attached figures and description.

DETAILED DESCRIPTION

Figure 1:
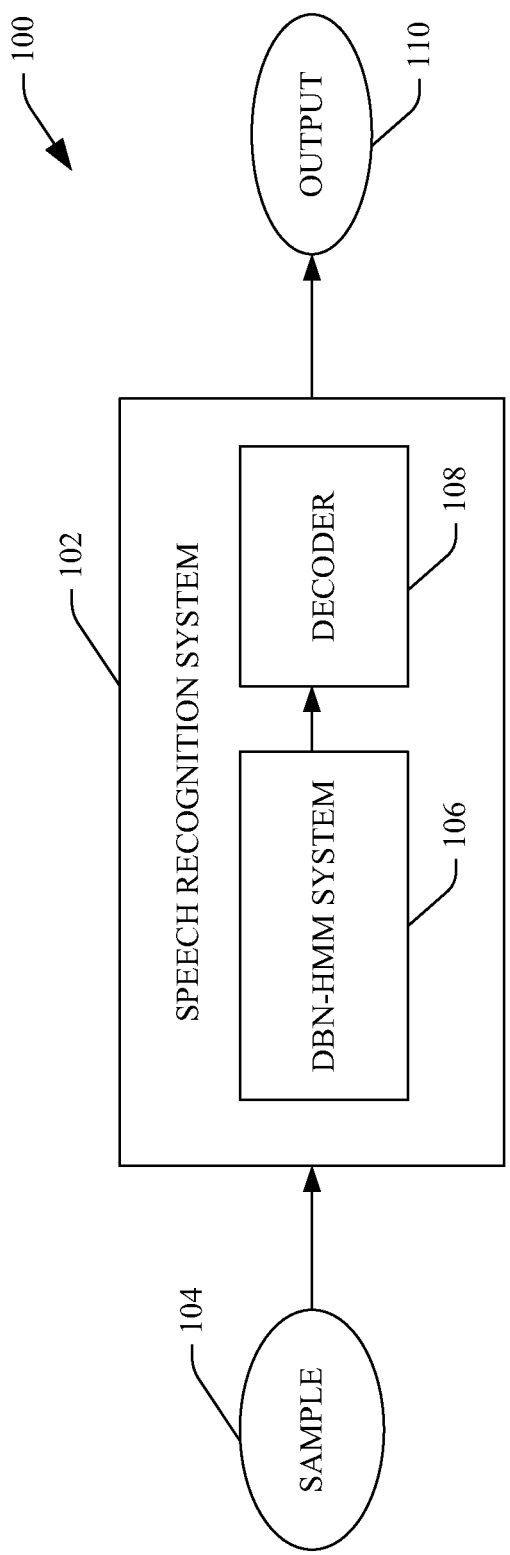
FIG. 1 is a functional block diagram of an exemplary system that facilitates performing automatic speech recognition (ASR) through utilization of a hybrid Deep Believe Network (DBN)—Hidden Markov Model (HMM).

Various technologies pertaining to automatic speech recognition (ASR) systems will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components, and some steps in methodologies described herein may be omitted, re-ordered, or combined.

With reference to FIG. 1, an exemplary system 100 that facilitates performing ASR is illustrated. The system 100 includes a speech recognition system 102 that receives a sample 104. The sample can be spoken words from an individual over a particular amount of time (e.g., captured through utilization of a microphone). The sample 104 can be digitized through utilization of an analog to digital converter, and can be subject to some form of normalization if desired. While the examples provided herein indicate that the sample 104 is a spoken utterance, it is to be understood that the system 100 may be configured to perform online handwriting recognition and/or real-time gesture recognition. Thus, the sample 104 may be an online handwriting sample or a video signal describing movement of an object such as a human being.

The speech recognition system 102 comprises a context-dependent Deep Belief Network (DBN)—Hidden Markov Model (HMM) system 106. A DBN is a probabilistic generative model with multiple layers of stochastic hidden units above a single bottom layer of observed variables that represent a data vector. Feed-forward artificial neural networks (ANNs) whose weights have been initialized by way of a pretraining phase described below can also be considered DBNs. An HMM is a generative model in which observable acoustic features are assumed to be generated from a hidden Markov process that transitions between states $S=\{s_1, \ldots, s_K\}$. The DBN-HMM system 106 is context dependent in that the DBN is configured to receive a vector of observations derived from the sample 104 and output probabilities with respect to senones corresponding to the sample 104. Senones are basic subphonetic units that can be represented by states in the HMM. Alternatively, if the number of states in the HMM is prohibitively large, senones can be represented as clustered state-dependent output distributions. The HMM in the DBN-HMM system 106 determines transition probabilities between senones. Accordingly, the DBN in the DBN-HMM system 106 can output probabilities with respect to senones. The speech recognition system 102 further comprises a decoder 108 that receives the output of the DBN-HMM system 106 and generates an output 110, wherein the output 110 is an indication of a word or phrase that corresponds to the sample 104.

Pursuant to an example, the speech recognition system 102 can be deployed in a variety of contexts. For instance, the speech recognition system 102 can be deployed in a mobile telephone, such that the mobile telephone can act responsive to spoken commands of a user. In another example, the speech recognition system 102 can be deployed in an automobile, such that the automobile can act responsive to spoken commands of a user. Other systems within which the speech recognition system 102 can be employed include automated transcribing systems, industrial automation systems, banking systems, and other suitable systems that employ ASR technology.

Additionally, the context-dependent DBN-HMM system 106 can be deployed in other types of systems. For instance, the DBN-HMM system 106 can be utilized in an online handwritten character recognition system (e.g., where an individual writes on a touch-sensitive screen). In such an embodiment, the DBN in the DBN-HMM system 106 can be configured to output probabilities pertaining to an arbitrary contextual unit (senones are related to phonetic units, and thus are not applicable to such a system). Still further, the DBN in the DBN-HMM system 106 can be replaced with some other suitable deep structure. An example of another type of deep structure includes a deep-structured Conditional Random Field (CRF) or other deep structures or convolutional neural networks.

Figure 2:
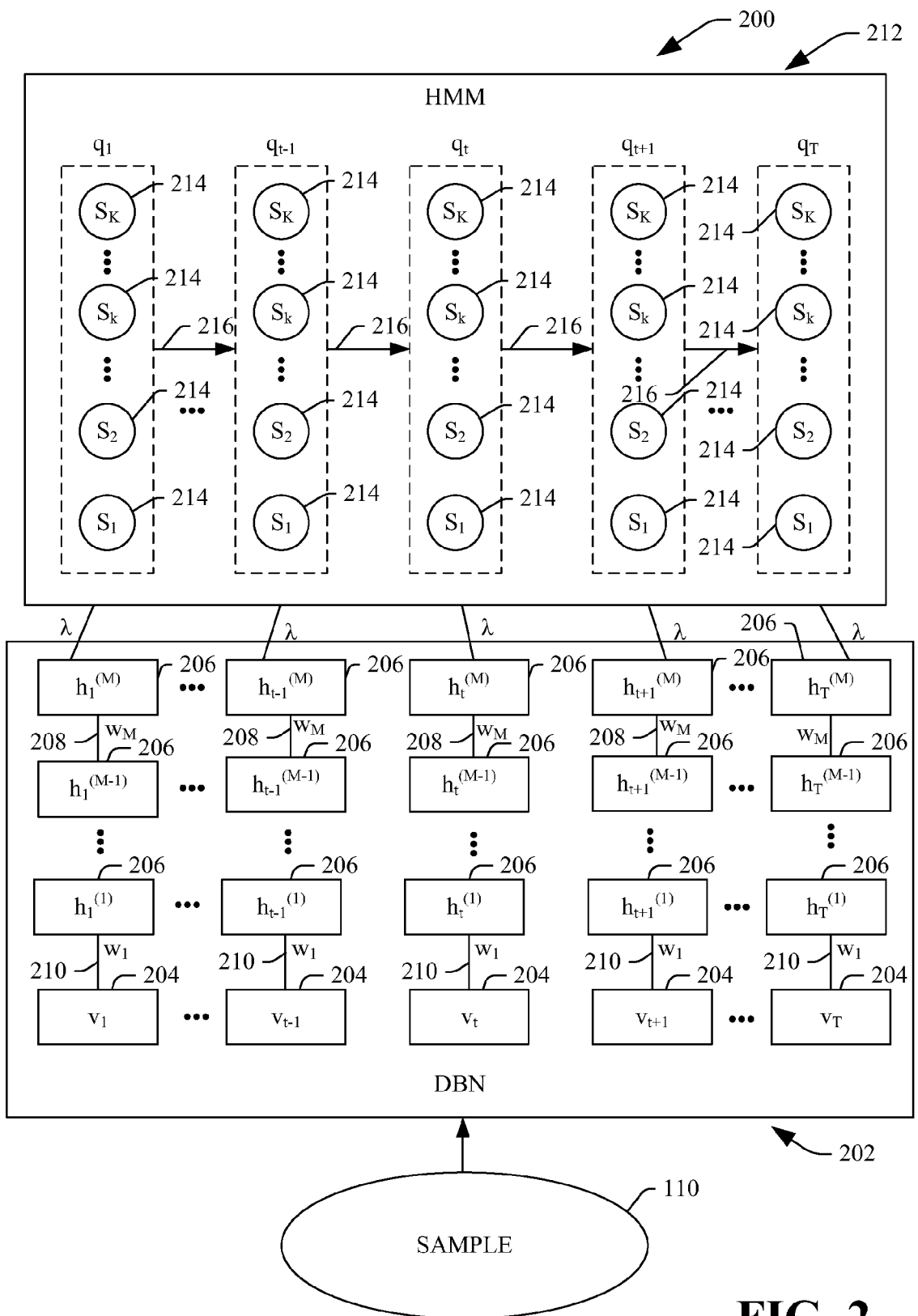
FIG. 2 is an exemplary depiction of a hybrid DBN-HMM.

Now referring to FIG. 2, an exemplary DBN-HMM 200 is illustrated. The DBN-HMM 200 comprises a DBN 202. The DBN 202 can receive the sample 110 or some derivation thereof, which can be partitioned into a plurality of observed variables 204 over time t. The observed variables 204 can represent data vectors at different instances in time. The DBN 202 further comprises multiple layers of stochastic hidden units 206. The DBN 202 has undirected connections 208 between the top two layers of the stochastic hidden units 206 and directed connections 210 to all other layers from the layers above. Weights w can be assigned to the directed and undirected connections 208 and 210, respectively, during a pretraining phrase that will be described in detail below. Additionally or alternatively, the DBN 202 can be a feed-forward neural network that is pre-trained using the DBN-pretraining strategy, where $\lambda$ is the softmax weight to convert a vector of binary probabilities to multinomial (multiple senones in this case) probabilities.

In this exemplary embodiment, the DBN 202 can be trained such that the output units in the uppermost layer (the Mth layer) can be modeled as a context-dependent unit, such as a senone. In more detail, the DBN-HMM 200 comprises an HMM 212. The HMM 212 can, for instance, be configured to output transitional probabilities for a plurality of senones 214. The transitional probabilities are shown as directed arrows 216 between groups of senones 214 in the HMM 212. During a training phase, which will be described herein, the output units of the DBN 202 can be aligned with the senones 214 in the HMM 212, wherein such output units model the senone posterior probabilities through the softmax weight $\lambda$. The HMM 212 can output transitional probabilities between the senones 214. As will be shown below, such outputs (senone posterior probabilities and transition probabilities) can be utilized to decode the sample 110.

By better predicting senones using the DBN 202, the context-dependent DBN-HMM 200 can achieve improved recognition accuracy when compared to conventional tri-phone GMM-HMMs. More precisely, the decoder 108 (FIG. 1) can determine the coded word sequence $\hat{w}$ as follows:

$$\hat{w}=\mathrm{argmax}_w p(w|x)=\mathrm{argmax}_w p(x|w)p(w)/p(x) \quad (1)$$

where p(w) is the language model (LM) probability, and $$p(x|w) = \sum_q p(x, q|w)p(q|w) \quad (2)$$

$$\cong \max \pi(q_0) \prod_{t=1}^{T} a_{q_{t-1}q_t} \prod_{t=0}^{T} p(x_t|q_t) \quad (3)$$

is the acoustic model (AM) probability. It can be noted that the observation probability $$p(x_t|q_t)=p(q_t|x_t)P(x_t)/p(q_t) \quad (4)$$

where $p(x_t|q_t)$ is the state (senone) posterior probability estimated from the DBN 202, $p(q_t)$ is the prior probability of each state (senone) estimated from a training set, and $p(x_t)$ is independent of the word sequence and can thus be ignored. It can be noted that dividing by the prior probability $p(q_t)$ may not improve recognition accuracy under some conditions and so may be omitted. Dividing by the prior probability, however, may alleviate label biasing problems, particularly when training utterances include relatively long silent segments.

It can further be noted that increasing $p(\bar{q}_t|x_t)$ for a correct state $\bar{q}_t$ can automatically decrease probabilities for competing states. Given the above, a correct word sequence for the utterance (sample 110) can be denoted as $\bar{w}$ and the best alignment associated with $\bar{w}$ can using GMM-HMMs and DBN-HMMs can be denoted as $\bar{q}_t^{gmm}$ and $\bar{q}_t^{dbn}$, respectively.

It can be further assumed that DBNs can better estimate the frame posterior probabilities, e.g., $$\Sigma_{t=0}^{T} \log p^{dbn}(\bar{q}_t^{gmm}|x_t) > \Sigma_{t=0}^{T} \log p^{gmm}(\bar{q}_t^{gmm}|x_t). \quad (5)$$

Given the same initial state probability and transition probabilities the change of the log posterior probability of the correct word sequence $\bar{w}$ is as follows:

$$\begin{aligned}
\delta &= \log p^{dbn}(w|x) - \log p^{gmm}(w|x) \quad (6) \\
&= \log p^{dbn}(x|w) - \log p^{gmm}(x|w) \\
&\cong \left[ \sum_{t=1}^{T} \log a_{q_{t-1}^{dbn} q_t^{dbn}} + \sum_{t=0}^{T} \log p^{dbn}(x_t|\bar{q}_t^{dbn}) \right] - \\
&\quad \left[ \sum_{t=1}^{T} \log a_{q_{t-1}^{gmm} q_t^{gmm}} + \sum_{t=0}^{T} \log p^{gmm}(x_t|\bar{q}_t^{gmm}) \right] \\
&\geq \left[ \sum_{t=1}^{T} \log a_{q_{t-1}^{gmm} q_t^{gmm}} + \sum_{t=0}^{T} \log p^{dbn}(x_t|\bar{q}_t^{gmm}) \right] - \\
&\quad \left[ \sum_{t=1}^{T} \log a_{q_{t-1}^{gmm} q_t^{gmm}} + \sum_{t=0}^{T} \log p^{gmm}(x_t|\bar{q}_t^{gmm}) \right] \\
&= \sum_{t=0}^{T} \log p^{dbn}(\bar{q}_t^{gmm}|x_t) - \sum_{t=0}^{T} \log p^{gmm}(\bar{q}_t^{gmm}|x_t) \\
&> 0,
\end{aligned}$$

where the $\geq$ step holds since $\bar{q}_t^{dbn}$ is a better alignment than $\bar{q}_t^{gmm}$ when the DBN-HMM is employed. This suggests that as the frame-level posterior probability (or likelihood) is improved using the alignment from the GMM-HMMs (described below), the posterior probability of the correct word sequence can be improved and better recognition accuracy can be obtained.

Figure 3:
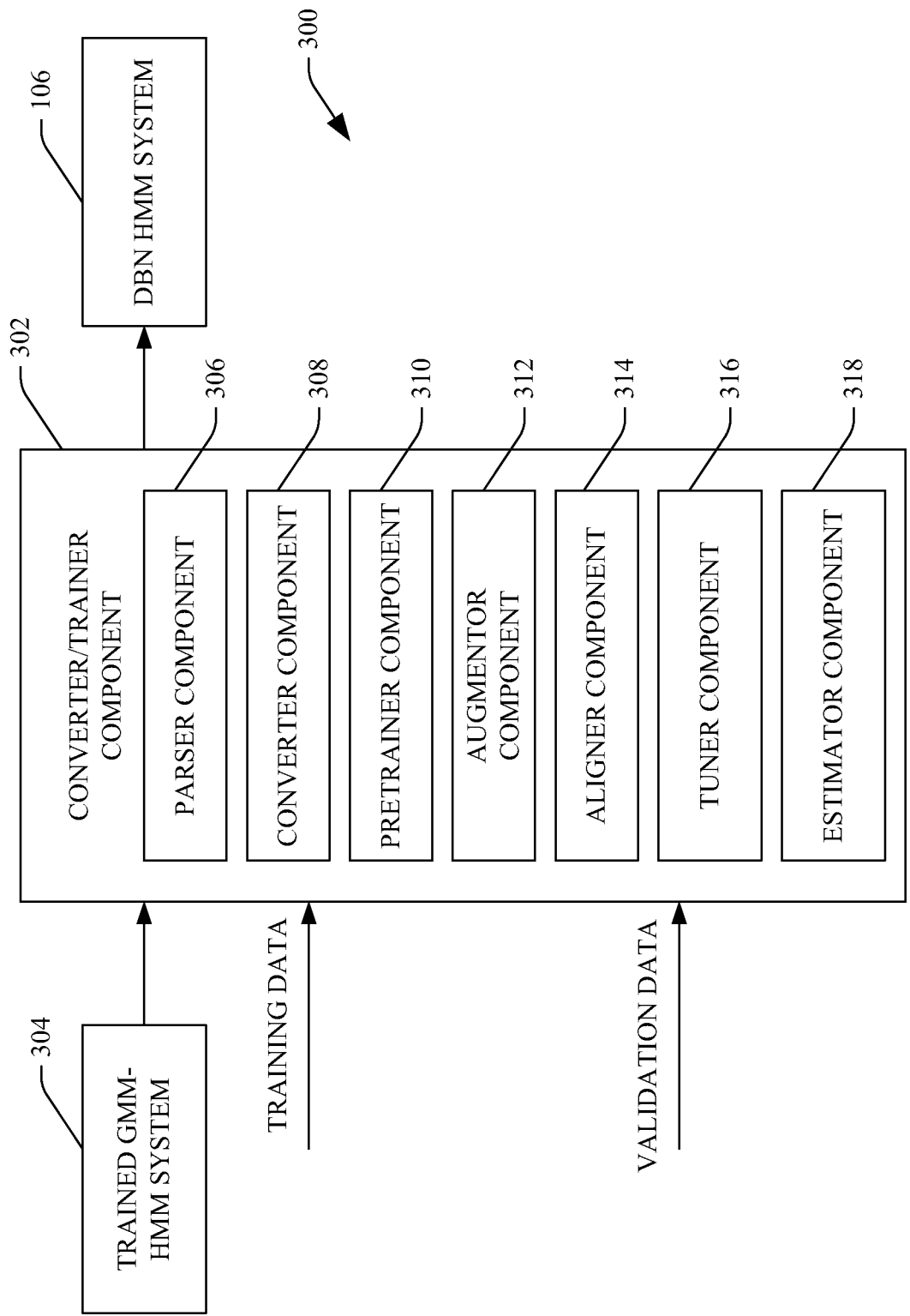
FIG. 3 is a functional block diagram of an exemplary system that facilitates training a DBN-HMM.

Referring now to FIG. 3, an exemplary system 300 that facilitates training the DBN-HMM system 106 is illustrated. The system 300 comprises a converter/trainer component 302 that receives a trained GMM-HMM system 304 and converts such system 304 to a DBN-HMM system. The GMM-HMM system 304 can be a best tied-state context-dependent GMM-HMM system that has been trained in accordance with conventional training techniques, where state tying is determined based on a data-driven decision tree. For reference, the GMM-HMM can be denoted as gmm-hmm.

The converter/trainer component 302 comprises a parser component 306 that parses gmm-hmm and assigns each senone with an ordered senone identifier, starting from zero. A senone identifier can be denoted as senoneid. The parser component 306 can further parse gmm-hmm to generate a mapping from each physical tri-phone state in the training data to the corresponding senoneid. This mapping can be denoted as state2id.

The converter/trainer component 302 further comprises a converter component 308 that converts the gmm-hmm to a DBN-HMM using the senone to senoneid mapping. This DBN-HMM can be denoted as dbn-hmm1. The tri-phone and senone structure from the gmm-hmm can be utilized by the converter component 308 to generate dbn-hmm1.

The converter/trainer component 302 also comprises a pre-trainer component 310 that can pretrain each layer from the bottom up in the DBN in dbn-hmm1. More details pertaining to pretraining will be provided below. The resulting pre-trained DBN can be referred to as ptdbn.

An augmentor component 312 can thereafter augment the lexicon such that each word pronunciation has at least two more variations: a first variation with a short pause (sp) appended to each word and a second variation with silence (sil) appended to each word. The augmented lexicon can be denoted lex-aug.

The converter/trainer component 302 further comprises an aligner component 314 that can utilize gmm-hmm to generate a state-level alignment on a training data set utilized to train the trained GMM-HMM system 304. This alignment can be denoted as align-raw. The aligner component 314 may thereafter convert each tri-phone state to senoneid, thereby converting align-raw to align.

A tuner component 316 can thereafter utilize the senoneid associated with each frame in align to fine-tune the DBN using back-propagation or other suitable approach, beginning from ptdbn. In other words, weights assigned to connections between layers in ptdbn can be utilized as initial weights when performing back-propagation. The fine-tuned DBN can be denoted as dbn.

The converter/trainer component 302 can further comprise an estimator component 318 that can estimate the prior probability $p(s_i) = n(s_i)/n$, where $n(s_i)$ is the number of frames associated with senone $s_i$ in align and n is the total number of frames. The estimator component 318 may then re-estimate the transition probabilities using dbn and dbn-hmm1 to maximize the likelihood of observing the features. This new DBN-HMM can be denoted as dbn-hmm2.

The dbn-hmm2 may then be provided with validation data, and validation samples can be decoded based at least in part upon output of dbn-hmm2. If there is no recognition accuracy improvement observed in the validation data, then dbn-hmm2 can be utilized as the DBN-HMM system 106. Otherwise, dbn, dbn-hmm2, and lex-aug can be employed to generate a new state-level alignment align-raw on the training data. The aligner component 314 may then receive align-raw, and the aligner component 314, the tuner component 316, and the estimator component 318 may operate as described above until there is no recognition accuracy improvement. The result of the training is the DBN-HMM system 106, which can be deployed in the speech recognition system 102.

It is to be understood that the procedure described above is exemplary in nature, and is not intended to be limiting as to the scope of the hereto-appended claims. For example, the above-described procedure may be modified in various manners. For example, the parser component 306 and the converter component 308 can be combined, and actions undertaken by the converter/trainer component 302 with no dependency between each other may be re-ordered. In addition, the DBN-HMM system 106 may be directly trained without using a GMM-HMM as the initial model under which condition steps/components related to the GMM-HMM conversion can be omitted. In such a case, components can be added that are configured to build decision trees to tie context-dependent phones and to grow a DBN-HMM.

In an exemplary embodiment, each senone in the resulting DBN-HMM system 106 can be identified as a (pseudo) single-mixture Gaussian whose dimension equals a total number of senones. For instance, the variance (precision) of the Gaussian may be irrelevant, and can be set to any positive value (e.g., always set to 1). The value of the first dimension of each senone's mean can be set to the corresponding senoneid described above. The values of other dimensions can be set to any value, such as zero. In such an embodiment, evaluating each senone is substantially equivalent to a table lookup of the features (log-likelihood) produced by the DBN with the index indicated by the senoneid.

Figure 4:
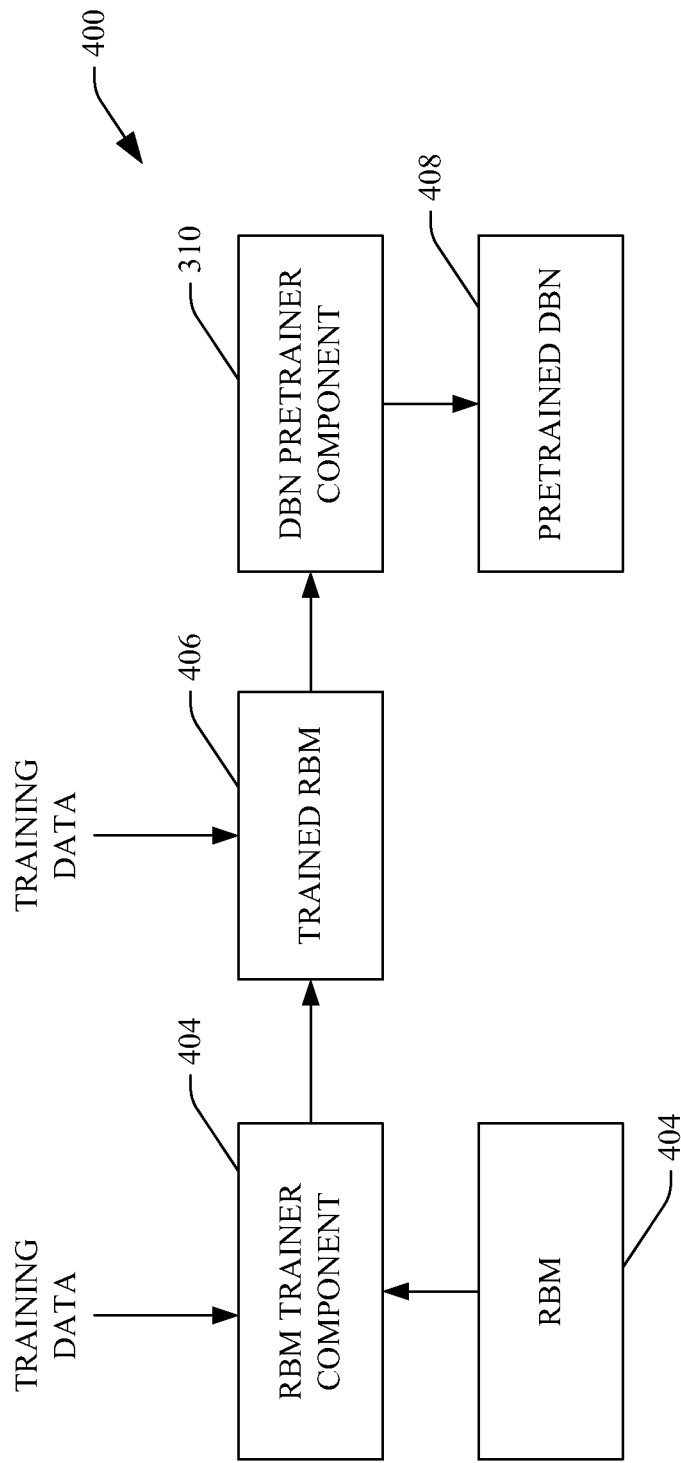
FIG. 4 is a functional block diagram of an exemplary system that facilitates pretraining a DBN.

Turning now to FIG. 4, an exemplary system 400 that facilitates initially training a DBN is illustrated. Specifically, the system 400 may be utilized to output ptdbn described above. In an exemplary embodiment, a trained Restricted Boltzmann Machine (RBM) can be employed in connection with outputting ptdbn. RBMs are a type of undirected graphical model constructed from a layer of binary stochastic hidden units and a layer of stochastic visible units that, for instance, may be Bernoulli or Gaussian distributed conditioned on the hidden units. The visible and hidden units form a bipartite graph with no visible-visible or hidden-hidden connections. For concreteness, it can be assumed that the visible units are binary. How real-valued speech data may be handled is described herein.

An RBN assigns an energy to every configuration of visible and hidden state vectors, denoted v and h respectively, according to the following:

$$E(v,h) = -b^T v - c^T h - v^T W h, \quad (7)$$

where W is the matrix of visible/hidden connection weights, b is a visible unit bias, and c is a hidden unit bias. The probability of any particular setting of the visible and hidden units can be given in terms of the energy of that configuration by the following:

$$P[v, h] = \frac{e^{-E(v,h)}}{Z}, \quad (8)$$

where the normalization factor $Z = \Sigma_{v,h} e^{-E(v,h)}$ is known as the partition function. The lack of direct connection within each allows for derivation of relatively simple exact expressions for P [v,h] and P [h,v], since the visible units are conditionally independent given the hidden unit states and vice versa. For the binary case, the following can be obtained:

$$P(h|v) = \sigma(c + v^T W) \quad (9)$$

$$P(v|h) = \sigma(b + h^T W^T) \quad (10)$$

where σ denotes the elementwise logistic sigmoid, $\sigma(x) = (1+e^{-x})^{-1}$.

In an RBM, the gradient of the log likelihood of the data is intractable to compute exactly. For an arbitrary model parameter θ, the general form of the derivative of the log likelihood of the data can be as follows:

$$\frac{\partial l(\theta)}{\partial \theta} \propto \left\langle \frac{\partial E}{\partial \theta} \right\rangle_{data} - \left\langle \frac{\partial E}{\partial \theta} \right\rangle_{model} \quad (11)$$

In particular, for the visible-hidden weight updates the following can be obtained:

$$\Delta w_{ij} \propto \langle v_i h_j \rangle_{data} - \langle v_i h_j \rangle_{model} \quad (12)$$

The first expectation, $\langle v_i h_j \rangle$ data, is the frequency with which the visible unit $v_i$ and the hidden unit $h_j$ are on together in training data and $\langle v_i h_j \rangle_{model}$ is that same expectation under the distribution defined by the model. The term $\langle . \rangle_{model}$ can take an exponential amount of time to compute exactly—accordingly, an approximation can be employed. Since RBMs are in the intersection between Boltzmann machines and product of experts models, they can be trained using contrastive divergence (CD). The one step CD update rule for the visible-hidden weights is as follows:

$$\Delta w_{ij} \propto \langle v_i h_j \rangle_{data} - \langle v_i h_j \rangle_1, \quad (13)$$

where $\langle . \rangle_1$ denotes the expectation over one step reconstructions. In other words, an expectation can be computed with samples generated by running the Gibbs sampler (defined using equations (9) and (10)) initialized at the data for one full step. Similar update rules for other model parameters can be derived by replacing $$\frac{\partial E}{\partial \omega_{ij}} = v_i h_j$$

in equation (13) with the appropriate partial derivative of the energy function.

Although RBMs with the energy function of equation (1) are suitable for binary data, in speech recognition the acoustic input is typically represented with real-valued feature vectors. The Gaussian-Bernoulli restricted Boltzmann machine (GRBM) only requires a slight modification of equation (7). Thus, an exemplary GRBN energy function that can be employed in connection with pretraining a GBN is as follows:

$$E(v,h) = \tfrac{1}{2}(v-b)^T(v-b) - c^T h - v^T W h. \quad (14)$$

It can be noted that equation (14) implicitly assumes that the visible units have a diagonal covariance Gaussian noise model with a variance of 1 on each dimension. In the GRBM case, equation (9) does not change, but equation (10) becomes as follows:

$$P(v|h) = N(b + h^T W^T, I) \quad (15)$$

where I is the appropriate identity matrix. In an exemplary embodiment, rather than sampling from the distribution above, the visible units can be set as being equal to their means.

The system 400 comprises a RBM trainer component 402 that receives an RBM 404 or GRBM (collectively referred to as the RBM 404) and trains such RBM 404 as described above utilizing CD to generate a trained RBM 406. The trained RBM 406 may then be utilized to re-represent training data that is desirably utilized to train the DBN. More particularly, the system 400 includes the pretrainer component 310, which is configured to receive a DBN and generate ptdbn. To perform pre-training, for each data vector v, equation (9) can be employed to compute a vector of hidden unit activation probabilities h. Such hidden activation probabilities can be utilized as training data for a new RBM. Thus, each set of RBM weights can be used to extract features from the output of the previous layer. Once the pretrainer component 310 ceases to train RBMs, the initial values for all weights of the hidden layers of an ANN with a number of hidden layers equal to the number of trained RBMs can be obtained. The output of the pretrainer component 310 can be a pretrained DBN 408 (ptdbn). After pretraining, a softmax output layer can be added and backpropagation can be used to fine-tune all weights in the network discriminately.

Figure 5:
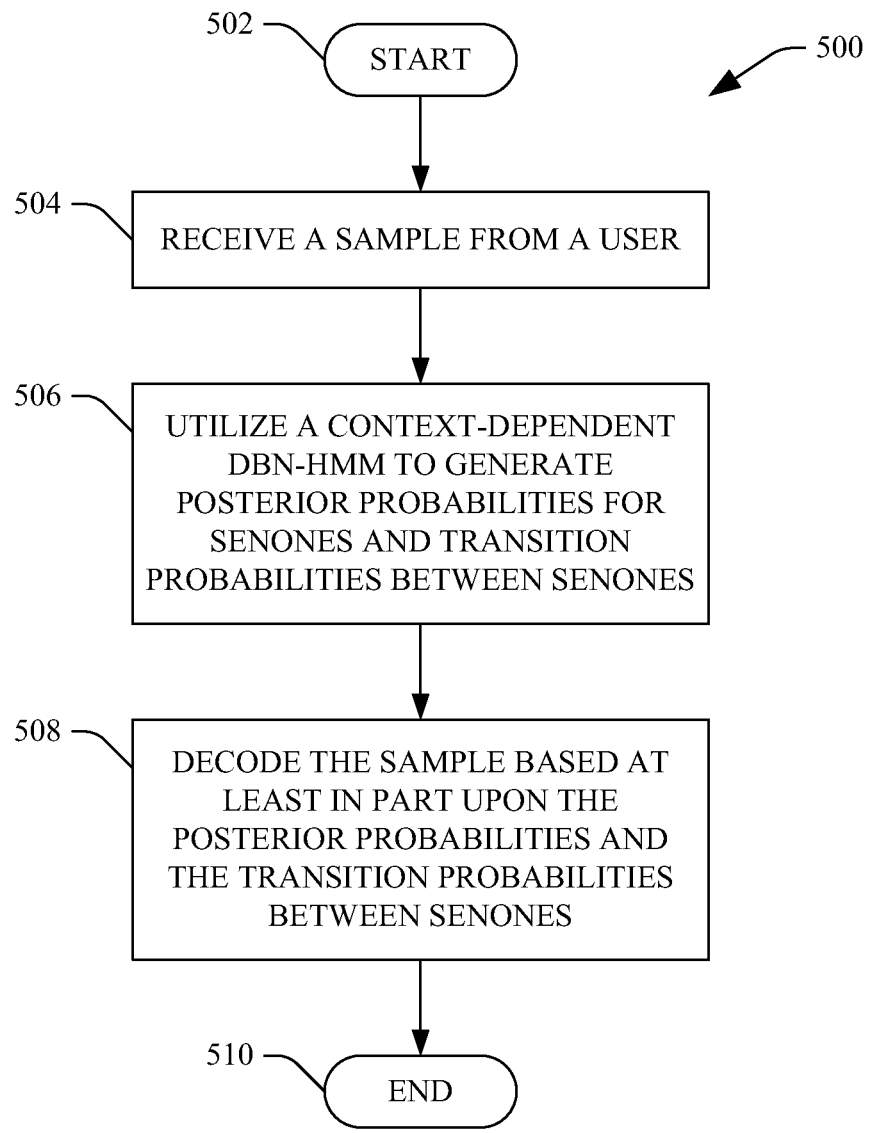
FIG. 5 is a flow diagram that illustrates an exemplary methodology for decoding a sample through utilization of a hybrid DBN-HMM.
Figure 6:
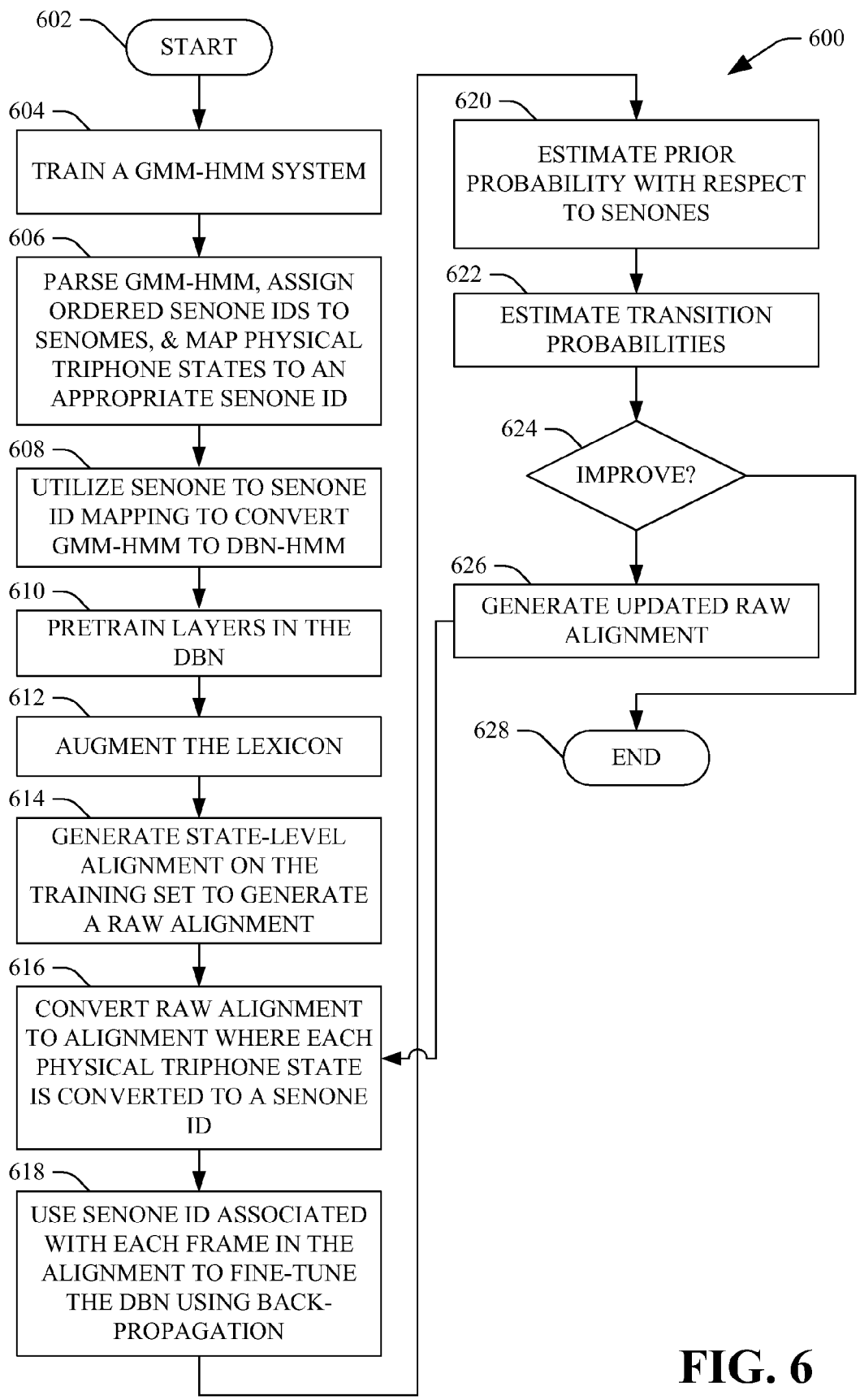
FIG. 6 is a flow diagram that illustrates an exemplary methodology for training a DBN-HMM for utilization in an ASR system.

With reference now to FIGS. 5 and 6, exemplary methodologies are illustrated and described. While the methodologies are described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

With reference solely to FIG. 5, an exemplary methodology 500 that facilitates decoding an utterance of an individual is illustrated. The methodology 500 begins at 502, and at 504 a sample utterance from a user is received. This utterance may be a single word or a word sequence of n words. At 506, a context-dependent DBN-HMM is utilized to generate posterior probabilities with respect to senones pertaining to the utterance as well as transition probabilities between senones. At 508, the sample utterance is decoded based at least in part upon the posterior probabilities and the transition probabilities output by the context-dependent DBN-HMM. The methodology 500 completes at 510.

Turning now to FIG. 6, an exemplary methodology 600 that facilitates training a DBN-HMM for utilization in a speech recognition system is illustrated. The methodology 600 corresponds to the system 300 described above. The methodology 600 starts at 602, and at 604 a GMM-HMM system is trained using labeled data. For instance, the GMM-HMM can be a clustered cross-word triphone GMM-HMM that is trained with maximum likelihood (ML), maximum mutual information (MMI), and minimum phone error (MPE) criteria using labeled training data. The GMM-HMM can use state-tied triphone models, wherein the tying structure is determined based at least in part upon data-driven decision trees. Again, this GMM-HMM can be denoted as gmm-hmm.

At 606, gmm-hmm is parsed, and each senone is given an ordered senoneid starting from zero. Additionally, gmm-hmm is parsed to generate a mapping from each physical triphone state in gmm-hmm to the corresponding senoneid. This mapping can be denoted as state2id.

At 608, gmm-hmm is converted to a corresponding DBN-HMM (dbm-hmm1) using the state2id mapping. The triphone and senone structure of gmm-hmm can be used in dbm-hmm1.

At 610, each layer in the DBN in dbm-hmm1 is trained utilizing the bottom-up layer by layer algorithm described in connection with FIG. 4 to create ptdbn.

At 612, the lexicon is augmented such that each word pronunciation has at least two additional variations: one with a short pause (sp) and one with silence (sil) appended. The augmented lexicon can be denoted as lex-aug.

At 614, a state-level alignment is generated on labeled training data utilizing gmm-hmm and lex-aug, such that substantially similar triphone states in the training data are aligned with one another.

At 616, the triphone states in the labeled training data is converted to a senoneid to generate align. Since senoneids are mapped to triphone states, it can be appreciated that senoneids can also be mapped to frames in the training data.

At 618, the senoneid associated with each frame in align is used to fine tune the DBN in using back-propagation or other suitable technique, starting from ptdbn. The resulting DBN can be denoted as dbn.

At 620, the prior probability of senones is determined: $p(s_i)=n(s_i)/n$, where $n(s_i)$ is the number of frames associated with senone $s_i$ in align and n is the total number of frames.

At 622, the transition probabilities between senones are re-estimated using dbn and dbn-hmm1 to maximize the likelihood of observing features in the labeled data. In other words, weights learned in the fine-tuning act of 618 can be utilized to convert features into senone posterior probabilities. The posterior probabilities may be divided by the prior probabilities determined at act 620 to generate the transition probabilities. The updated DBN-HMM can be denoted as dbn-hmm2.

At 624 a validation data set is provided to dbn-hmm2, and such validation data set is decoded based upon output of dbn-hmm2. If there is recognized improvement, then at 626 dbn, dbn-hmm2, and lex-aug can be used to generate a new state-level alignment align-raw and the methodology can return to 616. If no recognition accuracy improvement is seen in the validation data set, then dbn-hmm2 can be output for utilization in a speech recognition system and the methodology 600 completes at 628.

Again, as described above, some acts in the methodology 600 may be combined or omitted. For instance, in an exemplary embodiment, a GMM-HMM may not be employed to build the DBN-HMM. Additionally, one or more acts described above with respect to the methodology 600 may be omitted or combined with other act(s).

Figure 7:
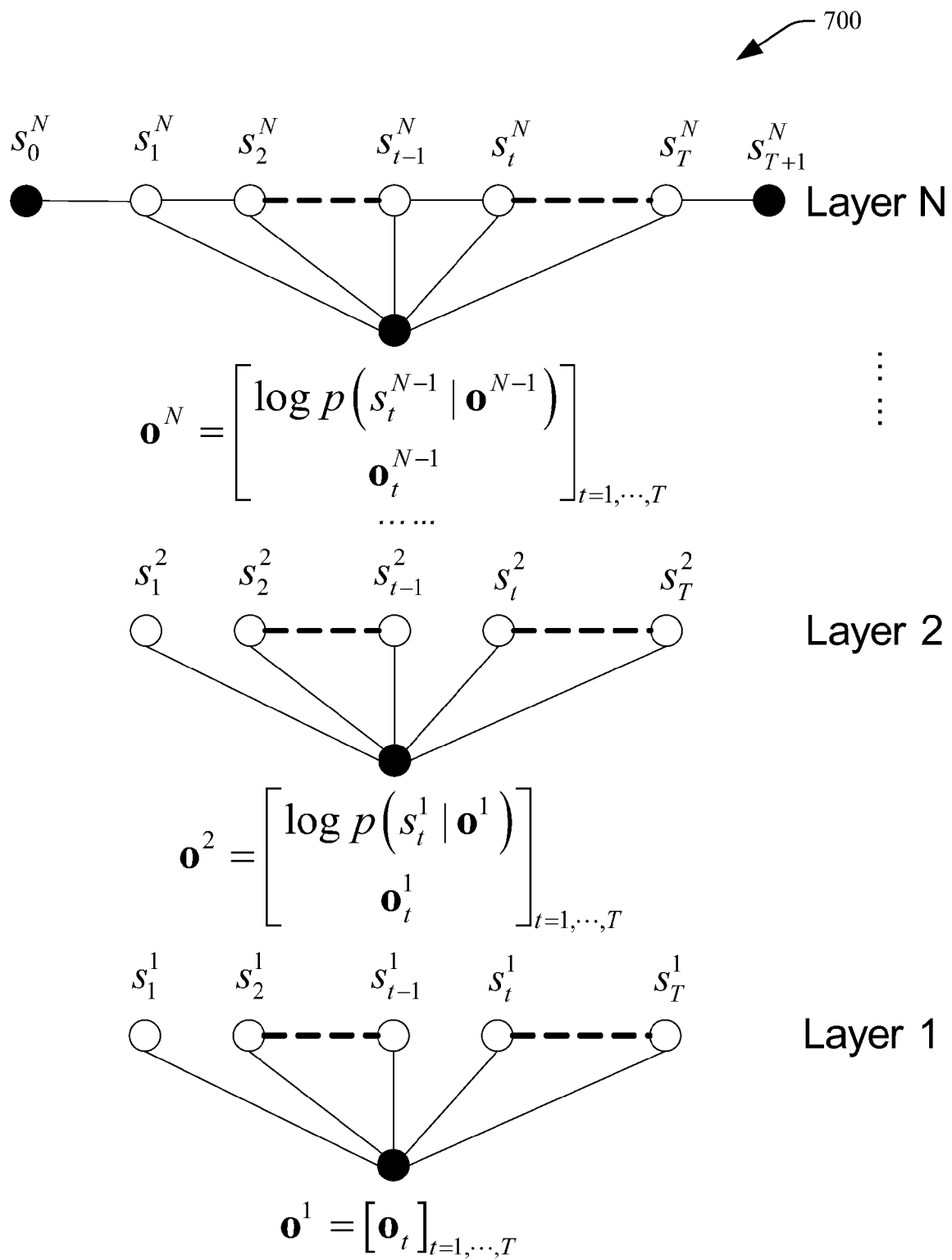
FIG. 7 illustrates an exemplary Deep Hidden Conditional Random Field.

The systems and methodologies shown and described above have generally referred to utilizing a DBN in a hybrid in a speech recognition system, as indicated above other deep structures can be employed. An exemplary deep structure that can be utilized is a Deep Hidden Conditional Random Field (DHCRF). Referring to FIG. 7, an exemplary DHCRF 700 is illustrated. In an example, the Nth layer of the DHCRF can be a Hidden Conditional Random Field (HCRF), and the intermediate layers can be zero-th order CRFs that do not use state transition features.

In the exemplary DHCRF 700, the observation sequence $o^j$ fat layer j consists of two parts: the preceding layer's observation sequence $o^{j-1}$ and the frame-level log marginal posterior probabilities $\log p(s_t^{j-1}|o^{j-1})$ computed from the preceding layer j−1, where $s_t^{j-1}$ is the state value at layer j−1. The raw observations at the first layer can be denoted as $o=[o_t]$, t=1, ..., T.

Both parameter estimation and sequence inference in the DHCRF can be carried out bottom-up, layer by layer. The final layer's state sequence conditional probability can be shown as follows:

$$p(w|o^N;\lambda^N) = \frac{1}{z(o^N;\lambda^N)} \sum_{s^N \in w} \exp((\lambda^N)^T f(w, s^N, o^N)) \quad (16)$$

where N is the total number of layers, $(\cdot)^T$ is the transposition of $(\cdot)$, $o^N=(o_1^N, \ldots, o_T^N)$ is the observation sequence at the final layer, w is the output sequence (senone, phoneme, word, etc.), $s^N=(s_1^N, \ldots, s_T^N)$ is a hypothesized state sequence, $f(w, s^N, o^N)=[f_1(w, s^N, o^N), \ldots, f_T(w, s^N, o^N)]^T$ is the feature vector at the final layer, $\lambda^N=[\lambda_1^N, \ldots, \lambda_T^N]^T$ is the model parameter (weight vector), and $z(o^N;\lambda^N)=\sum_{w, s^N \in w} \exp((\lambda^N)^T f(w, s^N, o^N))$ is the partition function (normalization factor) to ensure probabilities $p(w|o^N; \lambda^N)$ sum to one. It can be ascertained that invalid sequences can be ruled out by summing over valid phoneme or word sequences only.

In contrast to the final layer, the state conditional probabilities at the intermediate layer j can be as follows:

$$p(s^j|o^j;\lambda^j) = \frac{1}{z(o^j;\lambda^j)} \exp((\lambda^j)^T f(s^j, o^j)). \quad (17)$$

This is different from (16) in two ways. First, transition features are not used in (17) and observation features $f(s^j, o^j)$ can be simplified to $[f(s_t^j, o_t^j)]_{t=1, \ldots, T}$ of which is defined below.

Second, there is no summation over state sequences with all possible segmentations in (17).

Weights of the DHCRF can be learned utilizing a combination of supervised and unsupervised learning. The training supervision of the DHCRF 700 is available only at the final layer and can directly determined by the problem to be solved. For example, in the phonetic recognition task, the phoneme sequence w is known at the final layer during the training phase. Parameter estimation at the final layer can thus be carried out in a supervised manner. The supervision, however, is not available for the intermediate layers, which play the role of converting original observations to some intermediate abstract representations. For this reason, an unsupervised approach can be utilized to learn parameters in the intermediate layers.

There are several approaches to learning the intermediate layer representations in the DHCRF 700. For example, the intermediate layer learning problem can be cast into a multi-objective programming (MOP) problem in which the average frame-level conditional entropy is minimized and the state occupation entropy is maximized at a substantially similar time. Minimizing the average frame-level conditional entropy can force the intermediate layers to be sharp indicators of subclasses (or clusters) for each input vector, while maximizing the occupation entropy guarantees that the input vectors be represented distinctly by different intermediate states. The MOP optimization algorithm alternates the steps in optimizing these two contradictory criteria until no further improvement in the criteria is possible or the maximum number of iterations is reached. The MOP optimization, however, can become difficult when the number of classes in the intermediate layers becomes higher (as in a phone recognition task) since it is hard to control when to switch to optimize the other criterion given the vastly increased probability of being trapped into a local optimum.

Alternatively, a GMM-based algorithm can be employed to learn parameters in the intermediate layers of the DHCRF 700. This algorithm can utilize a layer-by-layer approach: once a lower layer is trained, the parameters of that layer are fixed and the observation sequences of the next layer are generated using the newly trained lower-layer parameters. This process can continue until all the layers are trained.

With more specificity, to learn the parameters of an intermediate layer, a single GMM with diagonal covariance (initialized from the corresponding HMM model which are optimized using the Gaussian splitting strategy) can be trained. The following can then be assigned as the state value to each observation frame $o_t^j$ at layer j by assuming each Gaussian component is a state, where $\mu_i^j$ and $\Sigma_i^j$ are the mean and variance of the i-th Gaussian component at layer j:

$$s_t^j = \operatorname{argmax}_i N(o_t^j; \mu_i^j, \Sigma_i^j) \tag{18}$$

The parameters of the CRF at layer j can then be learned by maximizing the regularized log-conditional probability as follows:

$$J_1(\lambda^j) = \sum_k \sum_t \log p\left(s_t^{(k),j} \mid o_t^{(k),j}; \lambda^j\right) - \frac{\|\lambda^j\|_1}{\sigma_1} - \frac{\|\lambda^j\|_2^2}{\sigma_2} \tag{19}$$

where k is the utterance ID, $\|.\|_1$ is a L1-norm to enforce sparseness of the parameters associated with each state value, $\|.\|_2^2$ is the square of L2-norm to give preference to smaller weights, and $\sigma_1$ and $\sigma_2$ are positive values to determine the importance of each regularization term. A regularized dual averaging method can be used to solve this optimization problem with L1/L2 regularization terms.

Pursuant to an example, transition features may not be used in the intermediate layers. Instead, only the first- and second-order observation features can be used as follows:

$$f_{s'}^{(M1)}(s_t,o_t) = \delta(s_t=s')o_t \forall s' \tag{20}$$

$$f_{s'}^{(M1)}(s_t,o_t) = \delta(s_t=s')o_t \circ o_t \forall s' \tag{21}$$

where ○ is an element-wise product.

The final layer of the DHCRF 700 can be trained to optimize the following in a supervised manner:

$$J_2(\lambda^N) = \sum_k \log p(w^{(k)} \mid o^{(k),N}) - \frac{\|\lambda^N\|_1}{\sigma_1} - \frac{\|\lambda^N\|_2^2}{\sigma_2} \tag{22}$$

where $w^{(k)}$ is the label for the output unit for the k-th utterance without segmentation information. In the final layer, the following can be used as features:

$$f_{w''w'}^{(LM)}(w,s,o) = [\delta(w_{i-1}=w'')\delta(w_i=w')]_{i=1,\ldots,I} \forall w''w' \tag{23}$$

$$f_{s''s'}^{(Tr)}(w,s,o) = [\delta(w_{i-1}=w'')\delta(w_i=w')]_{i=1,\ldots,I} \forall w''w' \tag{24}$$

$$f_{s'}^{(M1)}(w,s,o) = [\delta(s_t=s'')\delta(s_t=s')]_{t=1,\ldots,T} \forall s'',s' \tag{25}$$

$$f_{s'}^{(M2)}(w,s,o) = [\delta(s_t=s')o_t \circ o_t]_{t=1,\ldots,T} \forall s' \tag{26}$$

where $\delta(x)=1$ if x is true, and $\delta(x)=0$ otherwise. $f_{w''w'}^{(LM)}(w, s, o)$ are bi-gram language model (LM) features in which each output unit sequence w is consisted of I output units (e.g., senones, phonemes, or words), $f_{s''s'}^{(Tr)}(w, s, o)$ are state transition features, and $f_{s'}^{(M1)}(w, s, o)$ and $f_{s'}^{(M2)}(w, s, o)$ are the first- and second-order statistics generated from the observations, respectively.

Figure 8:
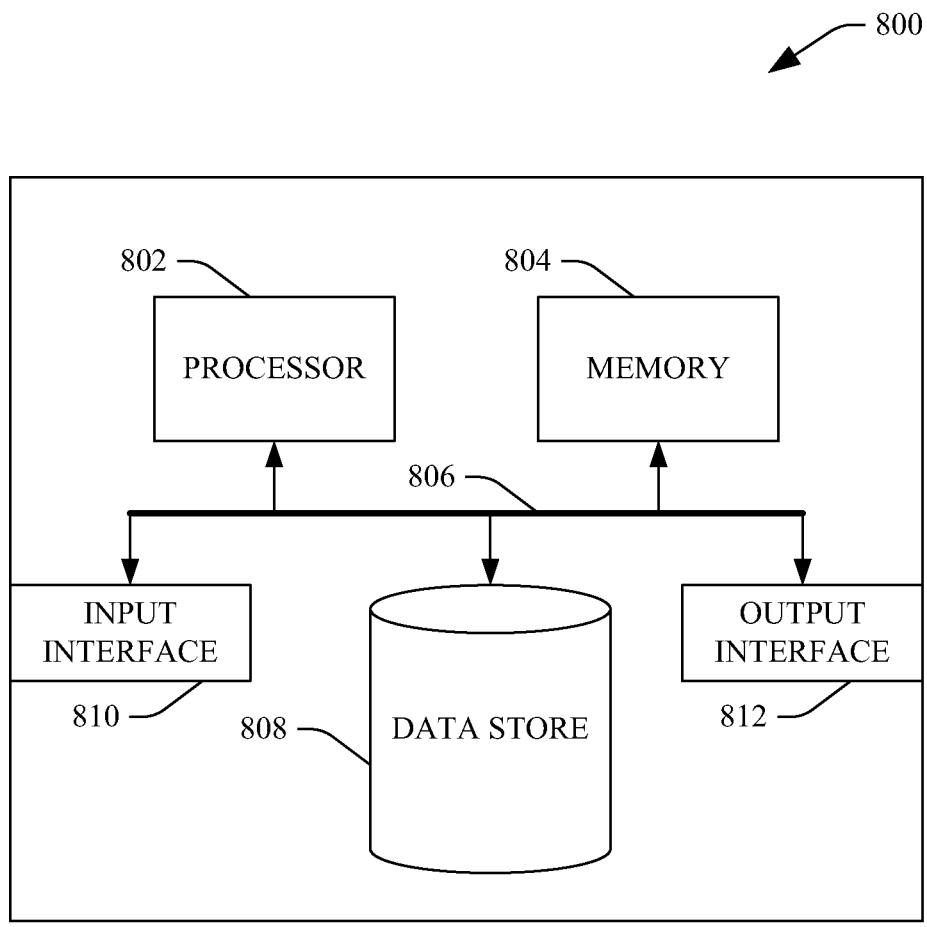
FIG. 8 is an exemplary computing system.

Now referring to FIG. 8, a high-level illustration of an example computing device 800 that can be used in accordance with the systems and methodologies disclosed herein is illustrated. For instance, the computing device 800 may be used in a system that supports ASR. In another example, at least a portion of the computing device 800 may be used in a system that supports training a DBN-HMM for utilization in ASR. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a training data set, a validation data set, a GMM-HMM, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, a GMM-HMM, a training data set, a validation data set, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a processor, the method comprising:
    receiving a sample at a context-dependent combination of a Deep Belief Network (DBN) and a Hidden Markov Model (HMM), wherein the sample is a spoken utterance
    outputting, at the DBN, a posterior probability distribution over labeled senones;
    outputting, at the HMM, transition probabilities between the labeled senones, the transition probabilities based upon the posterior probability distribution over the labeled senones; and
    decoding the sample based at least in part upon the posterior probability distribution over the labeled senones and the transition probabilities between the labeled senones.

2. The method of claim 1, wherein the DBN is a probabilistic generative model that comprises multiple layers of stochastic hidden units above a single bottom layer of observed variables that represent a data vector.

3. The method of claim 2, wherein the DBN is a feed-forward Artificial Neural Network (ANN).

4. The method of claim 1, further comprising, during a training phase for the combination of the DBN and the HMM, deriving the combination of the DBN and the HMM from a Gaussian Mixture Model (GMM)-HMM system.

5. The method of claim 1 configured to execute in a mobile computing apparatus.

6. The method of claim 1, further comprising:
    during a training phase for the context-dependent combination of the DBN and the HMM, performing pretraining with respect to the DBN, the DBN comprises a plurality of hidden stochastic layers, and wherein pretraining comprises utilizing an unsupervised algorithm to initialize weights of connections between the hidden stochastic layers.

7. The method of claim 6, further comprising utilizing back-propagation to further refine the weights of the connections between the hidden stochastic layers.

8. The method of claim 6, wherein a Restricted Boltzmann Machine is used in connection with the pretraining.

9. The method of claim 1, further comprising:
    during a training phase, aligning output units of the DBN with senones in the HMM, such that the output units are assigned the senones in the HMM.

10. The method of claim 1, further comprising:
    decoding the sample based part upon prior probabilities assigned to the labeled senones.

11. The method of claim 1, further comprising:
    receiving a Gaussian Mixture Model (GMM)-Hidden Markov Model (HMM) system that is trained to undertake automatic speech recognition; and
    converting the GMM-HMM to the DBN-HMM.

12. The method of claim 11, further comprising:
    utilizing an unsupervised training algorithm to initialize weights of the connections in the DBN; and
    utilizing back-propagation to refine the weights of the connections in the DBN.

13. A computer-implemented speech recognition system comprising:
    a processor; and
    a plurality of components that are executable by the processor, the plurality of components comprising:
        a computer-executable combination of a Deep Belief Network (DBN) and a Hidden Markov Model (HMM) that is configured to receive an input sample, wherein the input sample is based upon a spoken utterance, wherein the DBN is configured to output a posterior probability distribution over labeled senones, and wherein the HMM is configured to output transition probabilities between states, the states corresponding to the labeled senones; and
        a decoder component that is configured to decode a word sequence from the input sample based at least in part upon the posterior probability distribution over the labeled senones and the transition probabilities between the states.

14. The system of claim 13, wherein the DBN is a probabilistic generative model that comprises multiple layers of stochastic hidden units above a single bottom layer of observed variables that represent a data vector.

15. The system of claim 14, wherein the components further comprise a converter/training component that is configured to generate the combination of the DBN and the HMM based at least in part upon a Gaussian Mixture Model (GMM)-HMM system.

16. The system of claim 13 comprised by a portable computing apparatus.

17. The system of claim 16, wherein the portable computing apparatus is a mobile telephone.

18. The system of claim 13, wherein the DBN is pretrained with unlabeled data and refined through back-propagation.

19. The system of claim 13, wherein the decoder component that is configured to decode the word sequence from the input sample based part upon prior probabilities assigned to the labeled senones.

20. A computer-readable memory comprising instructions that, when executed by a processor, cause the processor to perform acts comprising:
    receiving a Gaussian Mixture Model (GMM)-Hidden Markov Model (HMM) system that is trained to undertake automatic speech recognition;
    converting the GMM-HMM to a Deep Belief Network (DBN)-HMM system, wherein the DBN comprises a plurality of layers of stochastic hidden units above a bottom layer of observed variables that represent a data vector, wherein the DBN comprises a plurality of undirected weighted connections between an uppermost two layers and directed weighted connections at other layers, wherein the DBN is configured to output posterior probabilities of senones pertaining to spoken utterances and the HMM is configured to output transition probabilities between the senones;

utilizing an unsupervised training algorithm to initialize weights of the connections in the DBN;

utilizing back-propagation to refine the weights of the connections in the DBN; and deploying the DBN-HMM in an automatic speech recognition system.

\* \* \* \* \*